July 23, 1940.    J. J. JANOSKO    2,208,985
SOCKET CONNECTION
Filed Dec. 13, 1939
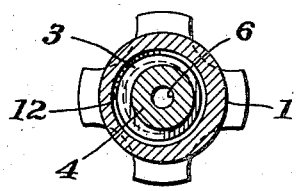
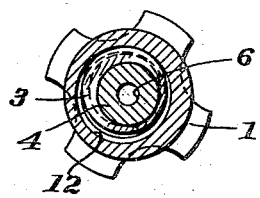
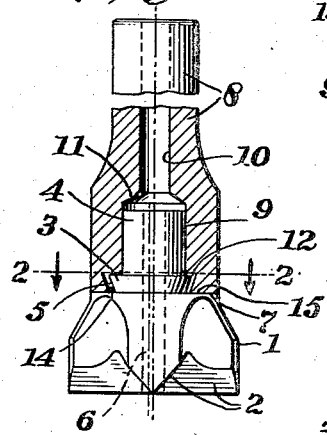
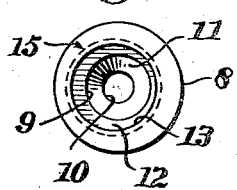
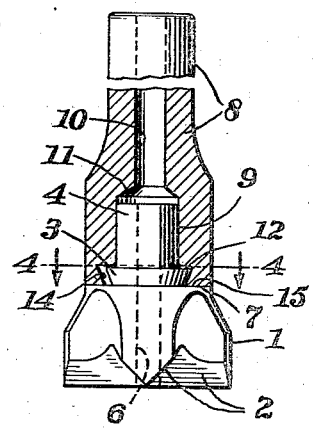
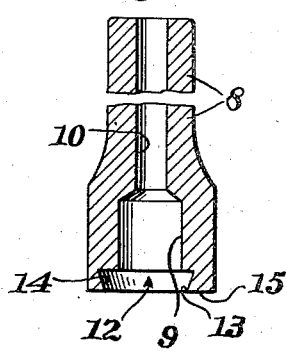
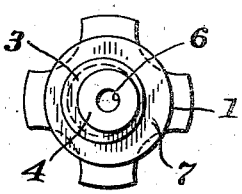
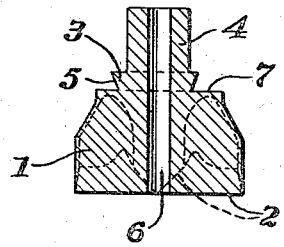
Inventor:
John J. Janosko,
By Parker Cook
Attorney.

Patented July 23, 1940

2,208,985

UNITED STATES PATENT OFFICE 2,208,985

SOCKET CONNECTION

John J. Janosko, Anaconda, Mont.

Application December 13, 1939, Serial No. 309,069

13 Claims. (Cl. 255—64)

My invention relates to new and useful improvements in socket connections, and has for an object to provide a connection that will be exceedingly strong and efficient in service.

Another object of the invention is to provide a socket connection that is especially adaptable to drills of various kinds wherein there is to be used a detachable bit.

A further object of the invention is to provide a socket connection wherein, after the parts are placed in position and one given a slight turn with relation to the other, any further rotation in the same direction will cause the parts to more tightly grip each other, so that any danger of their becoming disassociated is wholly overcome.

A further object of the invention is to provide a strong socket connection for a rock drill between the bit and the drill stem and to so provide the parts that the drill may be used either as a left-hand one or a right-hand one, as in both instances, after the drill bit is once set or locked with the drill stem, a further torsion or twist or rotation in the chosen direction will tend to more firmly hold the parts together.

Still another object of the invention is to provide a socket connection which is especially adapted for rock drills, as the parts may be quickly connected. If the drill is to be used as a right-hand drill, the bit, after insertion, will first be given a part rotation in a left-hand direction, so that any further rotation of the drill will cause the parts to more tightly grip each other. If the drill is to be used as a left-hand drill, the drill bit will be inserted in the drill stem and slightly turned in a right-hand or clockwise direction and the locking means will function in exactly the same manner.

A still further object of the invention is to provide a drill stem and drill bit wherein both parts are capable of being cheaply and easily manufactured, as the bit may be cast or forged and part of its shank or pilot turned concentric to the bit proper and then the bit reset off-center, so that an eccentric may be cut; which eccentric or cam cooperates with an eccentric chamber in the drill stem, which latter eccentric chamber may likewise be cut without difficulty.

Still another object of the invention is to provide a replaceable bit, the body of which is formed with a pilot or plug, which is concentric with the body and to further provide an eccentric portion, which cooperates with an eccentric chamber formed in the drill stem. Also the side walls of the eccentric portion of the bit as well as the side walls of a receiving chamber of the drill stem are frusto-conical, so that the two parts of the drill will be drawn together when the drill bit is turned by hand a partial turn either in a clockwise or anti-clockwise direction.

Still another object of the invention is to provide a socket connection that has all the advantages of a threaded connection and at the same time provide a far greater bearing and locking surface to thus better withstand the hard usage to which rock drills are put.

Still another object of the invention is to provide a drill bit and its drill stem, which are so arranged that the bit may be quickly placed in position and with a slight twist the parts will be forced into tight frictional engagement. In a like manner, when it is desired to remove the bit to grind and sharpen the same or to make a replacement, the bit may be quickly unlocked by tapping the teeth with a hammer and then rotating the bit to its original, rotative, insertive position.

Still another object of the invention is to present a relatively large contacting area between the drill stem and the bit, so that the hammering or percussive strains may be well transmitted to the bit.

With these and other objects in view, the invention consists in certain new and novel features and combination of parts, as will be hereinafter more fully explained and pointed out in the claims.

Referring now to the drawing showing a preferred embodiment of the invention;

Fig. 1 is a view partly in elevation and partly in section of a replaceable bit and drill stem or socket showing the bit as having just been placed within its socket;

Fig. 2 is a sectional view taken on the line 2—2 of Fig. 1;

Fig. 3 is a view similar to Fig. 1, but showing the bit rotated a partial turn with relation to the drill stem to cause the parts to be held in tight frictional engagement;

Fig. 4 is a sectional view taken on the line 4—4 of Fig. 3;

Fig. 5 is a vertical sectional view of the drill stem or socket;

Fig. 6 is a bottom plan view thereof;

Fig. 7 is a sectional view of the detachable bit; and

Fig. 8 is a top plan view thereof.

At the outset, it is to be understood that this form of socket connection is adaptable to a large field of mechanical endeavors and may be used in various arts wherein two parts are to be held in a locked position with relation to each other and wherein a further twisting will tend to draw the parts into tighter frictional engagement. Also the connection may be used where there is to be a rotation either in a left or right-hand manner but not in an oscillating manner.

In the drawing, I have chosen to illustrate the invention as embodied in a rock drill, as the bits have to be continually removed and reground and also new ones placed in position. Further, rock drills are subjected to great percussive strains as well as torsion and compression and this socket connection is especially adaptable, as the more torsion placed on the bit the tighter the parts will be locked together.

Referring now to the invention illustrated in Figs. 1 and 7, there is shown the hardened metal bit consisting of the body proper 1 with its teeth 2, which may be conventional. On the top of the body portion and centrally thereof may be seen the integral eccentric portion 3, which is in the shape of the frustum of a cone and the axis of which is eccentric to and parallel with the central axis of the bit. Extending above the eccentric portion 3 is the small integral plug or pilot 4, which is concentric with the body of the bit. The plug or pilot 4 may be of any conventional cross-section and of any desired length.

As heretofore mentioned, the eccentric 3 has the downwardly tapered side wall 5 and it is this eccentric hub with its tapered side wall that cooperates with the like tapered side wall of an eccentric chamber in the socket or drill stem which forces the bit and its socket into tight frictional engagement, as will be shortly mentioned.

The bit as well as the plug and the eccentric have the usual axial bore 6 to permit the flushing or pumping of water, air, or drilling compound to reach the cutting edges 2 of the bit in the usual manner.

It will be noted that the frustum or eccentric portion 3 is less in diameter than the diameter of the body of the bit at its upper edge, thus providing a rim of relatively large area 7, which will be drawn into frictional contact with the lower surface of the drill stem, as will be shortly mentioned.

It will be seen that this drill bit is one which may be easily produced, as the same may be cast or forged and the body hardened to withstand the percussive strains. The cylindrical pilot may be easily machined concentric to the bit proper and the drill bit then moved slightly off-center to cut the eccentric 3.

Referring to the drill stem or socket member of the coupling, the stem proper is illustrated, as at 8, and is provided with the concentric cylindrical chamber 9, into which leads the co-axial bore 10. The upper side wall of the chamber 9 may taper slightly toward the bore, as may be seen at 11.

In Figs. 1 and 3, I have shown the bit in place, and it will be noticed that the depth of the chamber 9 of the stem 8 is slightly greater than the length of its plug 4 of the bit 1.

Also, undercut within the lower end of the socket or drill stem 8 is the chamber 12, whose vertical central axis is slightly eccentric to the axis of the drill stem 8 and the chamber 9, the eccentricity of this chamber 12 being the same as the eccentricity of the frustum 3 on the bit. The diameter of the mouth or opening 13 of this chamber is just slightly larger than the greatest diameter of the eccentric 3 of the bit, so that when the bit is to be placed within its drill stem, the eccentric portion, when in its normal rotative, insertive position, will just nicely slide within this chamber. The depth of the chamber 12 is also slightly greater than the height of the eccentric 3.

It will be noticed that the side wall 14 of the chamber is tapered to the same degree that the side wall 5 of the eccentric is tapered.

It will also be noticed that as the diameter of the drill stem at its lower end is much greater than the diameter of the chamber 12 and is co-extensive with the diameter of the upper surface of the bit, there will be provided a relatively large bearing area 15 to contact with the rim 7 of the drill bit, heretofore-mentioned.

To lock the bit in position, the bit will be placed as shown in Fig. 1 within its drill stem, so that the pilot will readily pass up into its chamber and the eccentric 3 in a like manner will pass and fit within its receiving chamber 12. The bit 1 is given a slight turn or rotary movement about approximately 90° relative to the shank, which will cause the parts to be firmly locked, because a portion of the convex conical surface of the frustum or eccentric 3 is forced into engagement with the concave conical surface of the chamber 12.

As these conical surfaces are forced together, the bit 1 tends to move axially toward the shank, bringing the surfaces 7 and 15 of the bit and drill stem, respectively, into forced contact over their entire areas.

It will be understood that the plug or pilot fits snugly within its chamber to thus hold the bit at all times concentric with the shank and acts mainly as a pilot to facilitate the attachment of the bit to the shank.

If the drill is to be used as a right-hand drill, that is, to be rotated in a clockwise direction, after the bit is placed within the socket the bit will be turned in a direction opposite to the desired rotation to thus cause the tapered walls of the eccentric to lock within the tapered walls of its chamber. Any rotation, therefore, of the drill in a clockwise direction will tend to force the bit and its holder into tighter frictional contact, that is, the contacting area between the upper surface of the body of the bit and the lower surface of the drill stem.

In a like manner, if the drill is to be used as a left-hand drill, after the bit is inserted it will be turned in a clockwise direction with relation to its drill stem, so that a turning of the drill to the left or in an anti-clockwise direction will likewise tend to force the bit and its holder into tighter contact. This is an advantage as some drilling machines turn the drill in one direction while others turn the drills in an opposite direction.

To remove the bit, it will only be necessary to lightly tap the teeth of the bit at a tangent with a hammer to loosen the bit, after which it may be turned back a quarter of a turn to thus permit the eccentric or frusto-conical portion to slip from its retaining chamber.

From the foregoing, it will be seen that I have formed a socket connection which is especially adapted for a drill. The drill may be used either as a right-hand or a left-hand drill, but after the bit is once locked, having first ascertained the rotative direction of the drill, there is no possibility of the parts becoming disengaged, as the greater the torsion the greater the frictional contact between the two parts.

It will also be seen that by making the walls of the eccentric tapered or frusto-conical, all of the advantages of a thread connection are obtained and at the same time far more metal is provided than the usual thread and groove. Thus, the life of the bit and its socket will be far greater than those that are provided with a thread connection.

Further, it will be seen that it is not necessary to provide any locking or drift pins or cut any keyways, thus simplifying the cost of production.

Many slight changes are possible in the construction hereinbefore set forth without departing from the spirit and scope of the invention.

Having thus described my invention, what I claim as new and desire to secure by Letters Patent is:

1. A socket connection comprising a socket having a cylindrical concentric chamber, an enlarged undercut circular chamber registering with said first-mentioned chamber and the walls of said second chamber being eccentric to the walls of the first-mentioned chamber, the side walls of said second-mentioned chamber being tapered, a male member having a body portion, a pilot plug concentric to said body portion adapted to fit within the first-mentioned cylindrical concentric chamber, an integral eccentric member also having like tapered side walls interposed between the body portion and the plug, the eccentric member adapted to pass within the second chamber of the socket when the eccentric member is in a normal position whereby insertion and a partial rotation of said male member in said socket forces the side walls of the eccentric member tightly against the walls of its chamber to thereby draw and firmly hold the two parts together.

2. A socket connection comprising a male member and a female member, the lower end surfaces of the female member adapted to frictionally engage an upper surface of the male member, a concentric portion and an eccentric portion associated with the male member, a concentric chamber and an eccentric chamber associated with the female member for respectively receiving the said concentric and eccentric portions of the male member, the eccentric portion of the male member and one of the chambers of the female member each having coacting continuous frusto-conical side walls whereby a partial turning of the one member with relation to the other will cause said first-mentioned surfaces of the male and female members to be drawn into tight frictional engagement.

3. In a socket connection, a male member and a female member, the male member adapted to frictionally contact the lower end of the female member when in position, an unbroken concentric cylindrical chamber and an eccentric chamber in the female member and the eccentric chamber having unbroken frusto-conical side walls, an eccentric frusto-conical portion on the male member cooperating with the frusto-conical side walls in the eccentric chamber of the female member, a concentric unbroken cylindrical pilot located above the frusto-conical portion on the male member and fitting within the concentric cylindrical chamber of the female member whereby a slight turning of the male member within the female member will draw the male and female members into tight frictional contact.

4. A drill stem and detachable bit having cooperating bearing surfaces, said stem having a cylindrical concentric chamber and an undercut cylindrical eccentric chamber adjacent said first-mentioned chamber, the side walls of said last-mentioned chamber tapering downwardly throughout their height toward the center, said bit provided with a concentric cylindrical pilot plug to fit within said first-mentioned chamber, an eccentric portion beneath the plug having like tapering side walls, the said eccentric portion slidably fitting within the second-mentioned chamber when in normal position whereby insertion and a part rotation of said bit in said drill stem forces the bearing surfaces between the drill stem and bit firmly together.

5. A drill stem and detachable bit, the lower end of said stem and the base of the bit forming cooperating bearing surfaces, a concentric pilot, circular means tapered throughout its circumference formed on said bit, the drill stem having a concentric receiving chamber for the pilot and a chamber with circular tapered walls to receive said circular means, and the circular means and its chamber being eccentric with respect to the central axis of the bit and drill stem whereby an insertion of the bit into the drill stem and a part rotation thereof will cause the circular means to lock within its receiving chamber and draw the bearing surfaces between the bit and drill stem tightly together.

6. A drill socket and bit one of which has a pilot and the other of which has a pilot-receiving chamber and both the pilot and chamber being concentric to the central axis of the bit, a frustum on one member and a chamber having frusto-conical walls for receiving the frustum in the other member, the frustum and frustum-receiving chamber both located eccentric to the central axis of the bit, bearing surfaces between the bit and the socket whereby a part rotation of the bit in either direction from the normal insertive position will draw the bearing surfaces between the bit and its socket tightly together and prevent the removal of the bit until the bit is revolved to its normal insertive position.

7. A replaceable bit comprising a body, an eccentric circular locking member formed on top of the body of the bit, said eccentric locking member having tapering side walls throughout its circumference, and a pilot plug located above said eccentric locking member and concentric to the central axis of the bit.

8. A replaceable bit comprising a main body portion, a reduced circular eccentric portion to thereby form a resultant rim on the upper surface of said body portion, said eccentric member having inwardly tapering side walls throughout its height, and a plug located above said eccentric member and said plug being concentric to the central axis of the bit.

9. A bit comprising a body portion, a circular eccentric portion thereon having unbroken inwardly sloping side walls, and an integral pilot plug above said eccentric portion and concentric with the body portion.

10. A replaceable bit comprising a body portion and a pilot plug, an intermediate circular eccentric locking member having unbroken bevelled side walls, and a socket member provided with receptive chambers for receiving said plug and said eccentric locking member.

11. A drill bit and stem, locking means on the bit including an eccentric portion having continuous frusto-conical walls, an eccentrically located chamber in the stem also having cooperating continuous frusto-conical walls to thereby permit the bit to be turned a part rotation in either direction to thereby lock the bit in the stem.

12. A removable drill bit and stem, unbroken cylindrical means for holding the bit in a concentric position within the stem and eccentric means on the bit cooperating with an eccentric chamber in the stem for holding the parts in position, the eccentric means on the stem having continuous tapering side walls and the eccentric chamber in the stem having like continuous tapering side walls thus permitting the bit to be rotated a part turn in either direction and drawing the bit and stem together during said part rotation.

13. A socket and socket-fitting member, the socket-fitting member provided with eccentric and concentric means and the socket having eccentrically and concentrically arranged chambers to, respectively, receive the first-mentioned means, the eccentric means and the eccentric chamber having cooperating continuous tapered walls to thereby cause the socket-fitting member to be drawn tightly within the socket when the socket-fitting member is rotated a part turn.

JOHN J. JANOSKO.